United States Patent
Batish et al.

(10) Patent No.: US 8,028,108 B2
(45) Date of Patent: Sep. 27, 2011

(54) VIRTUAL KVM FUNCTIONALITY FOR COMPUTER SYSTEMS

(75) Inventors: Arun Batish, Portland, OR (US); Phong Doan Ly, Beaverton, OR (US); Jason Charles Myers, Hillsboro, OR (US); Paul Vu, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 12/400,944

(22) Filed: Mar. 10, 2009

(65) Prior Publication Data
US 2010/0235551 A1 Sep. 16, 2010

(51) Int. Cl.
*G06F 13/12* (2006.01)
*G06F 13/38* (2006.01)

(52) U.S. Cl. .......................... 710/72; 719/321
(58) Field of Classification Search ............ 710/72; 719/321, 331
See application file for complete search history.

(56) References Cited

U.S. PATENT DOCUMENTS

| | | | | |
|---|---|---|---|---|
| 5,293,101 A * | 3/1994 | Sakurai | ........... | 315/383 |
| 6,438,619 B1 * | 8/2002 | Coman | ........... | 719/319 |
| 6,636,929 B1 | 10/2003 | Frantz et al. | | |
| 7,015,833 B1 * | 3/2006 | Bodenmann et al. | ........... | 341/20 |
| 7,136,993 B2 | 11/2006 | Bolen et al. | | |
| 7,369,117 B2 * | 5/2008 | Evans et al. | ........... | 345/156 |
| 7,793,019 B1 * | 9/2010 | Sivertsen | ........... | 710/72 |
| 2003/0079055 A1 * | 4/2003 | Chen | ........... | 710/1 |
| 2005/0097576 A1 * | 5/2005 | Chew et al. | ........... | 719/328 |
| 2006/0117085 A1 * | 6/2006 | Nagao et al. | ........... | 709/203 |
| 2006/0139330 A1 * | 6/2006 | Kutch et al. | ........... | 345/163 |
| 2007/0285394 A1 * | 12/2007 | Lee et al. | ........... | 345/168 |
| 2008/0148296 A1 * | 6/2008 | Chen et al. | ........... | 719/328 |

OTHER PUBLICATIONS

Nicolas, Mark, Freedom from the OS: out-of-band remote-access KVM can provide an alternate path for restoring failed equipment ports, Findarticles, Communication News Oct. 2006, 4 pages.

* cited by examiner

*Primary Examiner* — Henry W Tsai
*Assistant Examiner* — Elias Mamo
(74) *Attorney, Agent, or Firm* — Griffiths & Seaton PLLC

(57) ABSTRACT

A method, system, and computer program product for implementing virtual keyboard video mouse (KVM) switching functionality using a processing device in communication with a memory device is provided. Keyboard, video, and mouse signals for a first computer are redirected to be carried over a standardized serial bus connecting the first computer to a second computer. Each of the keyboard, video, and mouse signals are carried at predetermined frequencies. The keyboard, video, and mouse signals on the second computer are identified and separated. The keyboard, video, and mouse signals are passed to an operating system on the second computer. The keyboard, video, and mouse signals are used by the operating system to manage the first computer.

19 Claims, 4 Drawing Sheets

VIRTUAL KVM FUNCTIONALITY FOR COMPUTER SYSTEMS

BACKGROUND OF THE INVENTION

1. Field of the Invention

The present invention relates in general to computers, and more particularly to apparatus, method and computer program product embodiments for implementing virtual keyboard video mouse (KVM) functionality for a target computer system using a portable computer.

2. Description of the Related Art

Computers and computer systems are found in a variety of settings in today's society. Computing environments and networks may be found at home, at work, at school, in government, and in other settings. Computing environments increasingly manage data in one or more datacenter environments apart from the interface that computer users typically associate. In many cases, the storage environments are located across wide area networks (WANs), in which data is sent to/received from the data system located remotely from the host. Datacenters are facilities used to house computer systems and associated components, such as telecommunications and storage subsystems. They generally include redundant or backup power supplies, redundant data communications connections, environmental controls, and security devices.

A datacenter may occupy one room of a building, one or more floors, or an entire building. Most of the equipment is often in the form of servers mounted in 19-inch rack cabinets, which are usually placed in single rows forming corridors between them. This allows personnel to access to the front and rear of each cabinet. In a typical data center environment, each of the rack mount servers shares a connection to a keyboard video mouse (KVM) switch. The user toggles the switch in order to connect to a desired server.

Use of traditional KVM switches presents occasional challenges, however. For example, if more than one person needs to use the console to which the KVM switch is connected, however, the first user must finish his/her task first. Only then may the second user toggle the switch and connect to a second server or system. In addition to the foregoing, each system must be connected via a dongle and cable form factor, and daisy-chained and connected to the shared KVM switch. This situation leads to disorganization among the server cables at the back of the rack. One false connection may lead to losing a connection to the other servers daisy-chained to that particular connector. Finally, the user must implement a separate KVM switch (including an attached keyboard, video, and mouse) for each rack in the datacenter environment.

Alternatives to conventional KVM functionality may reduce these issues, such as use of a virtual network computing (VNC) protocol for remote connection to a particular server. However, VNC also poses challenges on occasion. For example, if a particular server is booting into an operating system, it is impossible to remotely connect to the server using VNC in order for a user to determine what is happening in that server during the boot cycle. In those situations, only a physically connected keyboard, video display, and mouse allow the user visibility into the server and the ability to take an appropriate action.

SUMMARY OF THE INVENTION

In view of the above, a need exists for a mechanism to better provide KVM-type functionality to computer systems such as rack mount servers in a datacenter environment, without the drawbacks previously described. Accordingly, in one embodiment, by way of example only, a method for implementing virtual keyboard video mouse (KVM) switching functionality using a processing device in communication with a memory device is provided. Keyboard, video, and mouse signals for a first computer are redirected to be carried over a standardized serial bus connecting the first computer to a second computer. Each of the keyboard, video, and mouse signals are carried at predetermined frequencies. The keyboard, video, and mouse signals on the second computer are identified and separated. The keyboard, video, and mouse signals are passed to an operating system on the second computer. The keyboard, video, and mouse signals are used by the operating system to manage the first computer.

In another embodiment, again by way of example only, a system for implementing virtual keyboard video mouse (KVM) switching functionality between at least two computers using a processing device in communication with a memory device is provided. At least one device driver is operable on a first computer. The device driver is adapted for redirecting keyboard, video, and mouse signals for a first computer to be carried over a standardized serial bus connecting the first computer to a second computer. Each of the keyboard, video, and mouse signals are carried at predetermined frequencies. An application operable on the second computer. The application is adapted for identifying and separating the keyboard, video, and mouse signals on the second computer, and passing the keyboard, video, and mouse signals to an operating system on the second computer. The keyboard, video, and mouse signals are used by the operating system to manage the first computer.

In still another embodiment, again by way of example only, a computer program product for implementing virtual keyboard video mouse (KVM) switching functionality between at least two computers using a processing device in communication with a memory device is provided. The computer program product comprises a computer-readable storage medium having computer-readable program code portions stored therein. The computer-readable program code portions include a first executable portion for redirecting keyboard, video, and mouse signals for a first computer to be carried over a standardized serial bus connecting the first computer to a second computer. Each of the keyboard, video, and mouse signals are carried at predetermined frequencies. A second executable portion identifies and separates the keyboard, video, and mouse signals on the second computer. A third executable portion passes the keyboard, video, and mouse signals to an operating system on the second computer, wherein the keyboard, video, and mouse signals are used by the operating system to manage the first computer.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
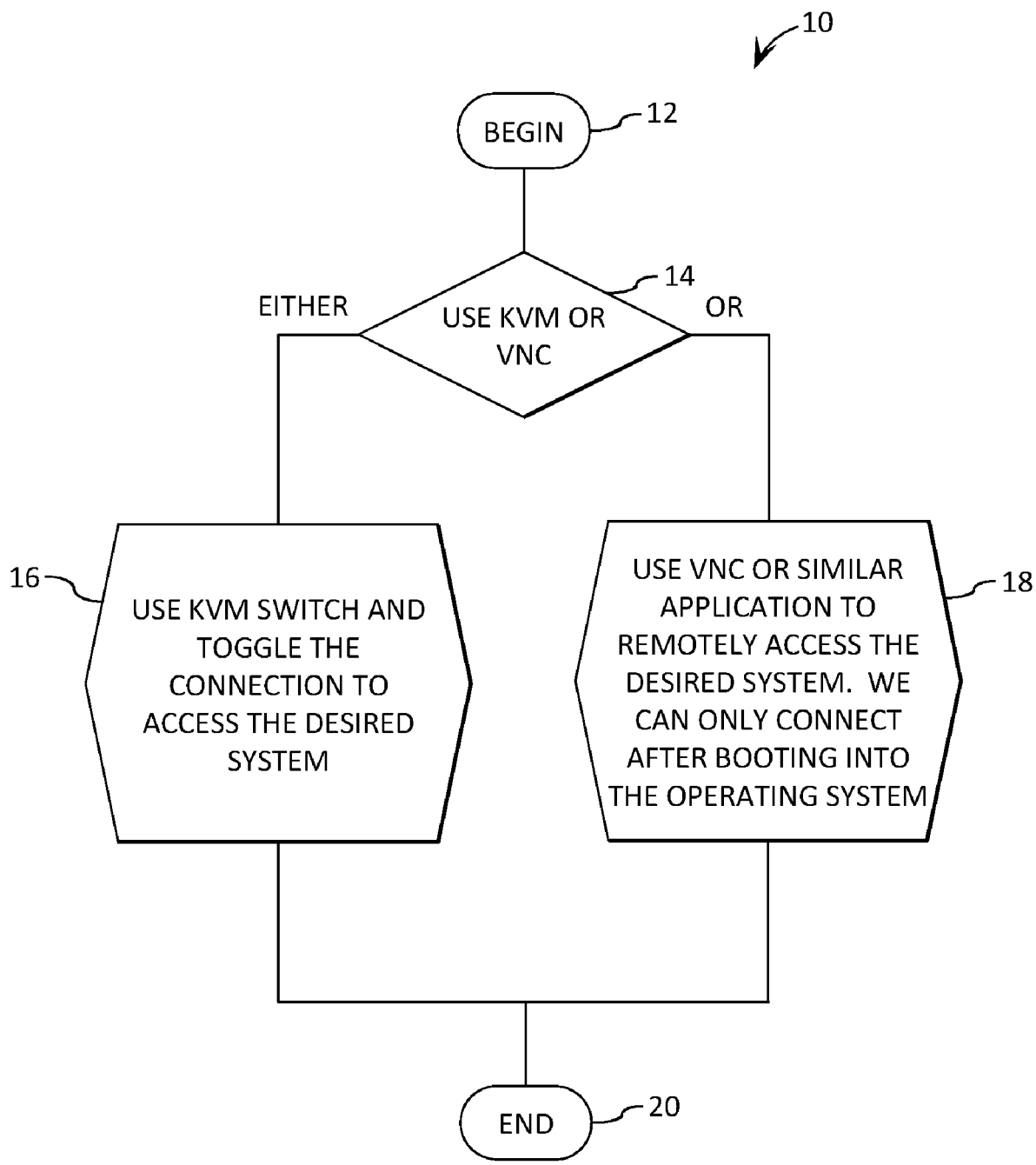
FIG. 1 is a flow chart of a prior art method for implementing KVM functionality for a computer system.

Turning to FIG. 1, following, a flow chart of a prior art method 10 for implementing KVM functionality for a target computer system. Method 10 begins (step 12) with a decision 14 to use either a physical KVM switch or VNC as previously described. If a KVM switch is utilized, the KVM switch toggles connections to access the desired target system (step 16). If VNC or a similar solution is used, the user may only connect following boot into the target system's operating system (step 18). The method 10 then ends (step 20). Implementation of KVM and/or VNC-type functionality has accompanying potential drawbacks as previously described.

In contrast, the illustrated embodiments below provide mechanisms for implementing virtual keyboard video mouse (KVM) functionality for a target computer system without the potential for the previously described drawbacks. In one embodiment, these mechanisms are facilitated through the use of a portable computer. The illustrated embodiments leverage two facets of the present invention. The first facet is a device driver application operable on the target system that redirects KVM signals from the typical communications paths of the target system to a standardized serial bus, such as a universal serial bus (USB) communications path. The KVM signals are each routed through the serialized communication path at predetermined frequencies. The second facet is an application operable on the portable computer that detects the redirected KVM signals, separates them from the combined serialized communication path, and passes the signals to the local operating system on the portable computer in order for the portable computer to manage the target system. The illustrated embodiments incorporate additional characteristics and perform additional functionality as will be further described, following.

Again, use of the mechanisms described in the illustrated embodiments serves to alleviate the issues described previously. For example, the mechanisms eliminate the dependency on a physical KVM switch, including the wiring, harnesses, and connections required to implement. The mechanisms allow the use of a portable computer, such as a laptop computer or personal desktop assistant to be used to manage the target system. The administrator is able to view activities occurring during boot cycles, such as power on self-test (POST) operations, and is able to take necessary action required using the personal computer. The mechanisms alleviate the need for additional skills expertise to implement KVM functionality. Any administrator may manage a target system using a portable computer.

Figure 2:
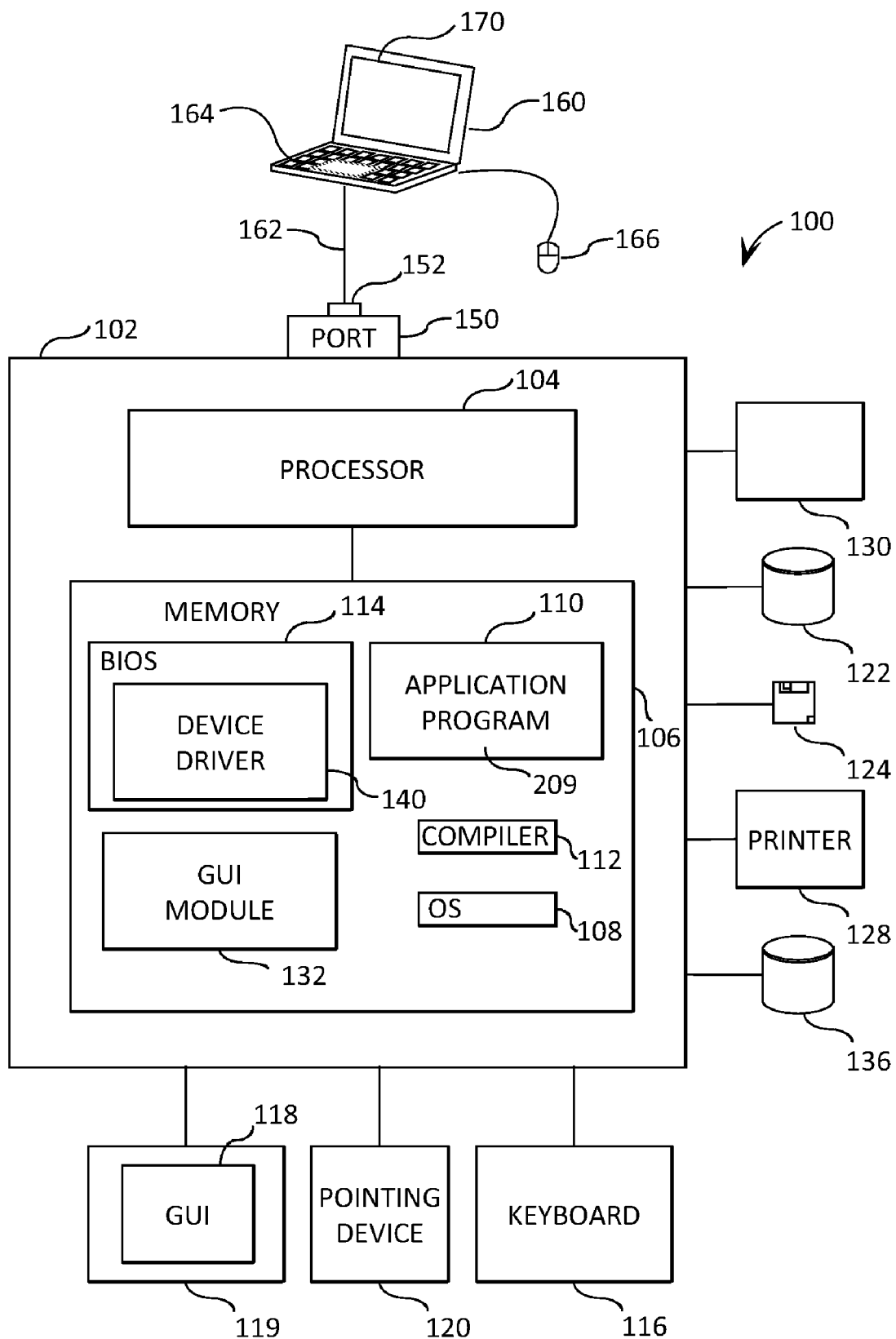
FIG. 2 is a block diagram an exemplary system for implementing virtual KVM functionality for a target computer system.

FIG. 2 hereafter provides an example of computer environment in which the mechanisms of the following embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

FIG. 2 illustrates an exemplary computer environment 100 that can be used to implement embodiments of the present invention. The computer 102 comprises a processor 104 and a memory 106, such as random access memory (RAM). The computer 102 is operatively coupled to a display 119, which presents images such as windows to the user on a graphical user interface (GUI) 118. The computer 102 may be coupled to other devices, such as a keyboard 116, a mouse device 120, a printer 128, etc. Of course, those skilled in the art will recognize that any combination of the above components, or any number of different components, peripherals, and other devices, may be used with the computer 102.

Generally, the computer 102 operates under control of an operating system (OS) 108 (e.g. z/OS, OS/2, LINUX, UNIX, WINDOWS, MAC OS) stored in the memory 106, and interfaces with the user to accept inputs and commands and to present results, for example through a GUI module 132. Although the GUI module 132 is depicted as a separate module, the instructions performing the GUI functions can be resident or distributed in the operating system 108, the computer program 110, or implemented with special purpose memory and processors.

The computer 102 also includes a basic input output system 114 (BIOS) acting as boot firmware on the computer 102 to identify, test, and initialize system devices. Device driver 140 is operable on BIOS 114. Device driver 140 is adapted for redirecting keyboard, video, and mouse signals normally routed to/from the GUI 118, the pointing device 120, and the keyboard 116 through communications port 150 and socket 152 over standardized serial communications path 162 to the portable computer 160. In one embodiment, the standardized serial communications path 162 is a universal serial bus (USB) link, such as a USB link compatible with version 3.0 of the communications protocol. In the depicted embodiment, the USB 3.0 link uses a standardized USB connector 152, which is inserted, for example, into USB communications port 150. As the skilled artisan will appreciate, a variety of communications protocols utilizing standardized serialized communications paths may be realized. The functionality provided by device driver 140 over the communications path 162 will be further described, following. Portable computer 160 includes a keyboard 164, a display 170, and mouse 166. When properly configured, a user may use the keyboard 164, display 170, and mouse 166 to perform management functions of the computer 102 normally provided by the GUI 118, pointing device 120, and keyboard 116.

The computer 102 also implements a compiler 112 that allows an application program 110 written in a programming language such as COBOL, PL/1, C, C++, JAVA, ADA, BASIC, VISUAL BASIC or any other programming language to be translated into code that is readable by the processor 104. After completion, the computer program 110 accesses and manipulates data stored in the memory 106 of the computer 102 using the relationships and logic that was generated using the compiler 112.

Data storage device 122 is a direct access storage device (DASD) 122, including one or more primary volumes holding a number of datasets. DASD 122 may include a number of storage media, such as hard disk drives (HDDs), tapes, and the like. Data storage device 136 may also include a number of storage media in similar fashion to device 122. The device 136 may be designated as a backup device 136 for holding backup versions of the number of datasets primarily stored on the device 122. As the skilled artisan will appreciate, devices 122 and 136 need not be located on the same machine. Devices 122 may be located in geographically different regions, and connected by a network link such as Ethernet. Devices 122 and 136 may include one or more volumes, with a corresponding volume table of contents (VTOC) for each volume.

In one embodiment, instructions implementing the operating system 108, the computer program 110, and the compiler 112, as well as the bios 114 and the device driver 140 are tangibly embodied in a computer-readable medium, e.g., data storage device 120, which may include one or more fixed or removable data storage devices, such as a zip drive, disc 124, hard drive, DVD/CD-ROM, digital tape, etc., which are generically represented as the disc 124. Further, the operating system 108 and the computer program 110 comprise instructions which, when read and executed by the computer 102, cause the computer 102 to perform the steps necessary to implement and/or use the present invention. Computer program 110 and/or operating system 108 instructions may also be tangibly embodied in the memory 106 and/or transmitted through or accessed by the data communication device 130. As such, the terms "article of manufacture," "program storage device" and "computer program product" as may be used herein are intended to encompass a computer program accessible and/or operable from any computer readable device or media.

Embodiments of the present invention may include one or more associated software application programs 110 that include, for example, functions for managing a distributed computer system comprising a network of computing devices, such as a storage area network (SAN). Accordingly, processor 104 may comprise a storage management processor (SMP). The program 110 may operate within a single computer 102 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those skilled in the art. (Note that a fibre channel SAN is typically used only for computers to communicate with storage systems, and not with each other.) As one skilled in the art will appreciate, however, various additional components of the environment 100 may work individually or in concert to define, initialize, and perform the functionality for implementing virtual KVM functionality as will be further described.

Figure 3:
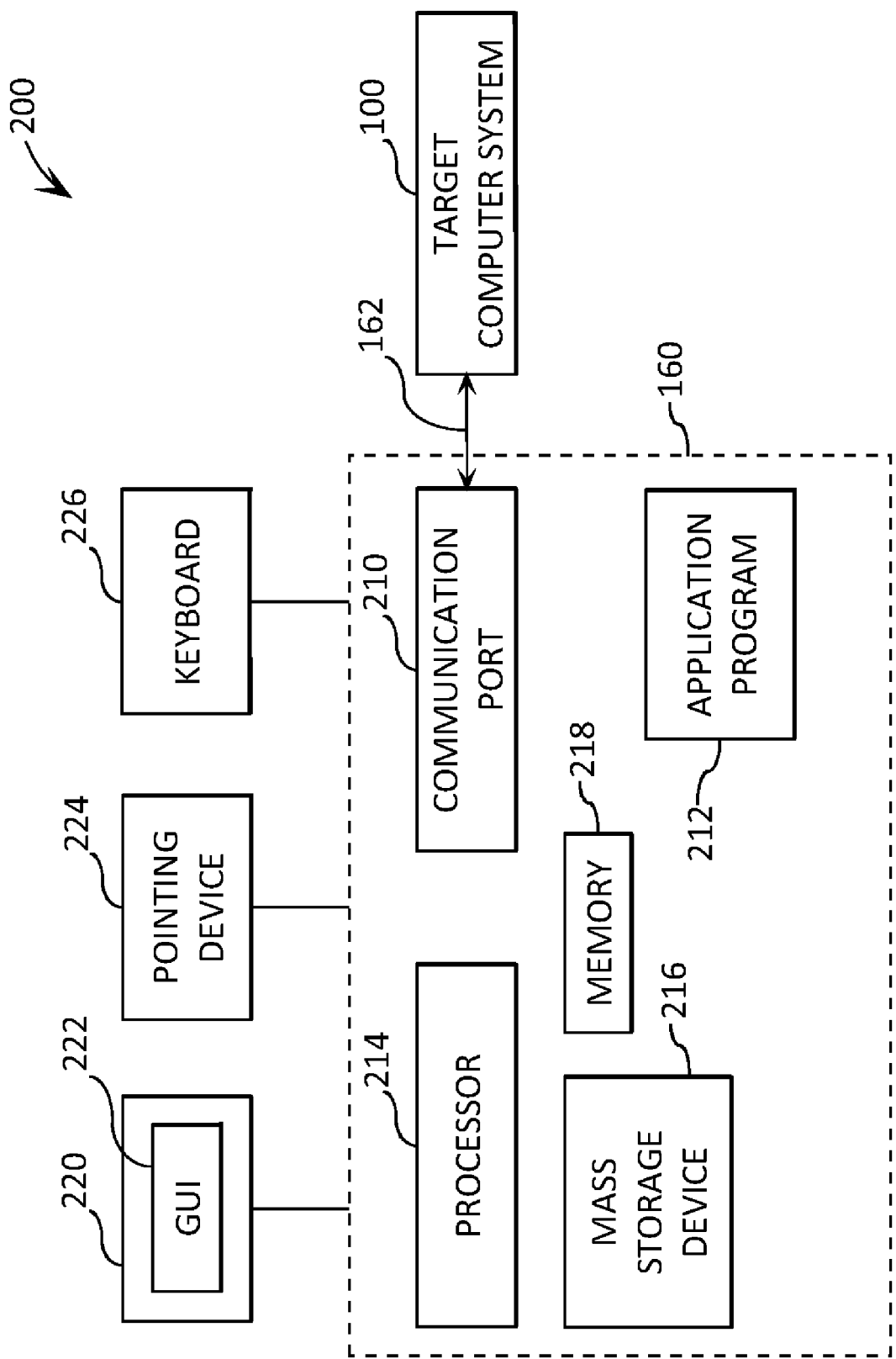
FIG. 3 is a block diagram of exemplary electronic components of a portable computer in communication with the target computer system depicted in FIG. 2.

Turning to FIG. 3, a block diagram of exemplary electronic components 200 of portable computer 160 is shown. Computer 160 is connected over communications path 162 the target computer system 100 (see also FIG. 2 previously) as described above via communication port 210. Computer 160 includes a processor 214, memory 218, and a mass storage device 216. An application program 212 is operable on the computer 160 as will be further described. Finally, computer 160 is connected to a display 222 having a GUI 222, a pointing device 224 such as a mouse, and a keyboard 226.

Application program 212 as operable on computer 160 is adapted for performing functionality relating to identifying and separating the KVM signals redirected from the target computer system 100. In one embodiment, these signals are provided over the communications path 162 (e.g., the USB 3.0 communications path depicted in FIG. 2) to/from the target computer system 100 at certain predetermined frequencies, such as 27.195 MHz for the keyboard, 27.145 MHz for the mouse, and between 150 and 200 MHz for video signals.

In one embodiment, application program 212 includes plug-ins or "hooks" to the native operating system's keyboard, video, and mouse controlling application programming interfaces (APIs). In this way the program 212 may substitute other KVM signals for those normally provided to the computer 160's operating system. These KVM signals are redirected from the target computer system 100 over the communications path 162. Application program 212 identifies the redirected signals, separating each of the signals from the serialized communication path. The redirected, separated signals are then provided or passed to the computer 160's APIs responsible for keyboard, video and mouse control, effectively overriding control of the keyboard, video, and mouse of the personal computer, and allowing the keyboard, video, and mouse of the personal computer to be used to manage the target computer system 100.

Figure 4:
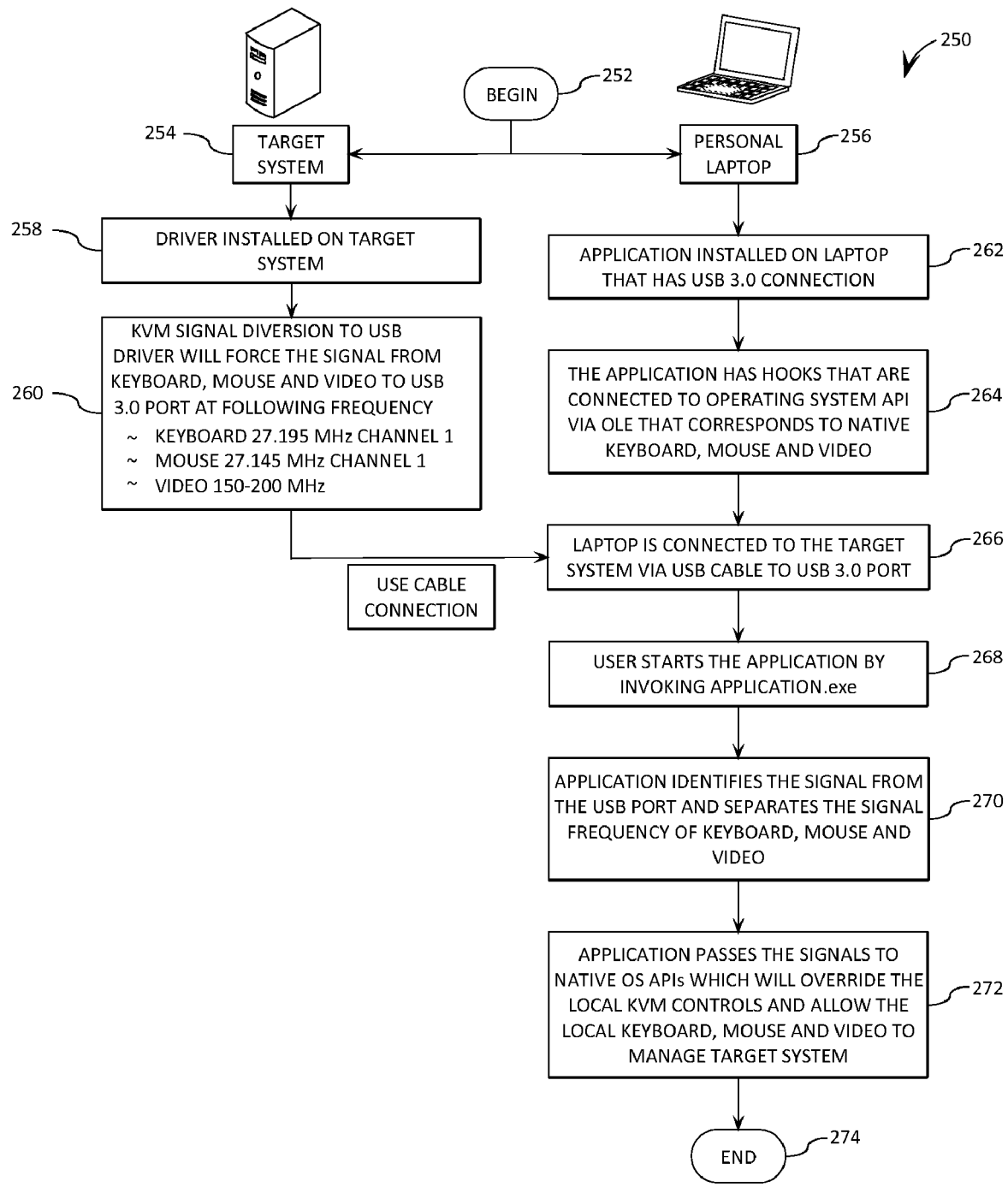
FIG. 4 is a flow chart of an exemplary method for implementing virtual KVM functionality for a target computer system.

Turning to FIG. 4, an exemplary method 250 is depicted for implementing virtual KVM functionality for a target computer system using the mechanisms of the present invention. As one skilled in the art will appreciate, various steps in the method 250 may be implemented in differing ways to suit a particular application. In addition, the described method may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 250 begins (step 252) with parallel processes executed on both the target system (step 254) and the portable computer, in this case a personal laptop (step 256). On the target system, a device driver is installed to be operable in conjunction with the target system's BIOS as previously described (step 258). The device driver functions to divert or redirect the KVM signals to the target system's USB 3.0 port at the depicted frequencies (27.195 MHz for keyboard signals, 27.145 MHz for mouse signals, and 105-200 MHz for video signals) (step 260). Of course, the skilled artisan will appreciate that additional frequencies may be implemented.

On the personal laptop side, an application program is installed (step 262). The application has hooks connected to APIs of the personal laptop's OS using objective linking and embedding (OLE). These hooks correspond to native keyboard, mouse, and video signals of the personal laptop (step 264). As a next step, the personal laptop is connected to the target system via a USB 3.0 communications port (step 266). The user starts the application by invoking the application's executable file (step 268).

Once the application program is operational, the signals carried from the target system over the USB cable are identified and separated (step 270). The application then passes each of the keyboard, video, and mouse signals to the native OS APIs, effectively overriding the local KVM controls and allowing the local keyboard, local mouse, and local video of the personal laptop to be used to manage the target system (step 272). The method 250 then ends (step 274). While method 250 describes one exemplary methodology, the skilled artisan will appreciate that variations to the depicted methodology may be performed. For example, several possible communications schemes may be implemented between the personal laptop and the target system. In one embodiment, upon termination of the application, the connection of the keyboard, video, and mouse signals for the first computer with the API of the operating system of the second computer is terminated.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for implementing virtual keyboard video mouse (KVM) switching functionality using a processing device in communication with a memory device, comprising:
    redirecting first keyboard, first video, and first mouse signals from a rack-mount computer system a standardized serial bus detachably connecting the rack-mount computer system to a portable computer, wherein each of the first keyboard, first video, and first mouse signals are carried at predetermined frequencies;
    receiving, by the portable computer, the redirected first keyboard, first video, and first mouse signals from the rack-mount computer system;
    identifying and separating the first keyboard, first video, and first mouse signals on the portable computer;
    passing the first keyboard, first video, and first mouse signals to an operating system on the portable computer;
    overriding control of second keyboard, second video, and second mouse signals for the portable computer in response to receiving the first keyboard, first video, and first mouse signals; and
    utilizing, by the operating system, the first keyboard, first video, and first mouse signals to manage the rack-mount computer system,
    wherein the first keyboard signal is carried at approximately 27.195 MHz, the first mouse signal is carried at approximately 27.145 MHz, and the first video signal is carried between 150 and 200 MHz.

2. The method of claim 1, wherein redirecting the keyboard, video, and mouse signals is performed using at least one device driver application operable on the first computer.

3. The method of claim 1, wherein identifying and separating the first keyboard, first video, and first mouse signals on the second portable computer is performed using an application operable on the portable computer.

4. The method of claim 3, wherein the application uses an object linking and embedding (OLE) mechanism to connect the first keyboard, first video, and first mouse signals for the rack-mount computer system with an application programming interface (API) of the operating system of the portable computer to manage the rack-mount computer system.

5. The method of claim 4, further comprising, upon termination of the application, terminating connecting the first keyboard, first video, and first mouse signals for the rack-mount computer system with the API of the operating system of the portable computer.

6. The method of claim 1, wherein redirecting the first keyboard, first video, and first mouse signals for the rack-mount computer system to be carried over the standardized serial bus connecting the rack-mount computer system to the portable computer includes redirecting the first keyboard, first video and first mouse signals for the rack-mount computer system over a universal serial bus (USB) communications link operable between the rack-mount computer system and the portable computer.

7. A system for implementing virtual keyboard video mouse (KVM) switching functionality between at least two computers using a processing device in communication with a memory device, comprising:
    a rack-mount computer system comprising at least one device driver operable on the rack-mount computer system; and
    a portable computer configured to be detachably coupled to the rack-mount computer system and comprising an application operable on the portable computer, wherein:
    the at least one device driver is adapted for redirecting first keyboard, first video, and first mouse signals from the rack-mount computer system to the portable computer over a standardized serial bus detachably connecting the rack-mount computer system to the portable computer, wherein each of the first keyboard, first video, and first mouse signals are carried at predetermined frequencies,
    wherein the application is adapted for receiving the redirected first keyboard, first video, and first mouse signals from the at least one device driver, identifying and separating the first keyboard, first video, and first mouse signals on the portable computer, passing the first keyboard, first video, and first mouse signals to an operating system on the portable computer, and overriding control of second keyboard, second video, and second mouse signals for the portable computer in response to receiving the first keyboard, first video, and first mouse signals, and
    further wherein the first keyboard, first video, and first mouse signals are used by the operating system to manage the rack-mount computer system,
    wherein the first keyboard signal is carried at approximately 27.195 MHz, the first mouse signal is carried at approximately 27.145 MHz, and the first video signal is carried between 150 and 200 MHz.

8. The system of claim 7, wherein the application uses an object linking and embedding (OLE) mechanism to connect the first keyboard, first video, and first mouse signals for the rack-mount computer system with an application programming interface (API) of the operating system of the portable computer to manage the rack-mount computer system.

9. The system of claim 8, wherein the application is further adapted for, upon termination:
    terminating connecting the first keyboard, first video, and first mouse signals for the rack-mount computer system with the API of the operating system of the portable computer; and re-enabling the second keyboard, second video, and second mouse signals on the portable computer in response to terminating connection of the first keyboard, first video, and first mouse signals.

10. The system of claim 7, wherein the standardized serial bus connecting the rack-mount computer system to the portable computer includes a universal serial bus (USB) communications link operable between the rack-mount computer system and the portable computer.

11. The system of claim 10, wherein the USB communications link incorporates at least one standardized serial interface socket.

12. A non-transitory computer program product for implementing virtual keyboard video mouse (KVM) switching functionality between at least two computers using a processing device in communication with a memory device, the computer program product comprising a computer-readable storage medium having computer-readable program code portions stored therein, the computer-readable program code portions comprising:
 a first executable portion for redirecting first keyboard, first video, and first mouse signals for a rack-mount computer system over a standardized serial bus connecting the rack-mount computer system to a portable computer, wherein each of the first keyboard, first video, and first mouse signals are carried at predetermined frequencies;
 a second executable portion for identifying and separating the first keyboard, first video, and first mouse signals on the portable computer;
 a third executable portion for passing the first keyboard, first video, and first mouse signals to an operating system on the portable computer;
 a fourth executable portion for overriding control of second keyboard, second video, and second mouse signals for the portable computer in response to receiving the first keyboard, first video, and first mouse signals; and
 a fifth executable portion for utilizing, by the operating system, the first keyboard, first video, and first mouse signals to manage the rack-mount computer system,
 wherein the first keyboard signal is carried at approximately 27.195 MHz, the first mouse signal is carried at approximately 27.145 MHz, and the first video signal is carried between 150 and 200 MHz.

13. The non-transitory computer program product of claim 12, wherein the first executable portion for redirecting the first keyboard, first video, and first mouse signals is implemented using at least one device driver application operable on the rack-mount computer system.

14. The non-transitory computer program product of claim 12, wherein the second executable portion for identifying and separating the first keyboard, first video, and first mouse signals on the portable computer is implemented using an application operable on the portable computer.

15. The non-transitory computer program product of claim 14, wherein the application uses an object linking and embedding (OLE) mechanism to connect the first keyboard, first video, and first mouse signals for the rack-mount computer system with an application programming interface (API) of the operating system of the portable computer to manage the rack-mount computer system.

16. The non-transitory computer program product of claim 15, further comprising, upon termination of the application, a sixth executable portion for terminating connecting the first keyboard, first video, and first mouse signals for the rack-mount computer system with the API of the operating system of the second portable computer.

17. The non-transitory computer program product of claim 12, wherein the first executable portion for redirecting the first keyboard, first video, and first mouse signals for the rack-mount computer system over the standardized serial bus connecting the rack-mount computer system to the portable computer includes a sixth executable portion for redirecting the first keyboard, first video and first mouse signals for the rack-mount computer system over a universal serial bus (USB) communications link operable between the rack-mount computer system and the portable computer.

18. The non-transitory computer program product of claim 16, further comprising a seventh for re-enabling the second keyboard, second video, and second mouse signals on the portable computer in response to terminating connection of the first keyboard, first video, and first mouse signals.

19. The method of claim 5, further comprising re-enabling the second keyboard, second video, and second mouse signals on the portable computer in response to terminating connection of the first keyboard, first video, and first mouse signals.

* * * * *